Jan. 14, 1969     A. O. RAMSLEY     3,422,266
APPARATUS FOR EVALUATING THE EFFECTIVENESS OF CAMOUFLAGE
AGAINST DETECTION BY INFRARED PHOTOGRAPHY
Filed Jan. 19, 1967
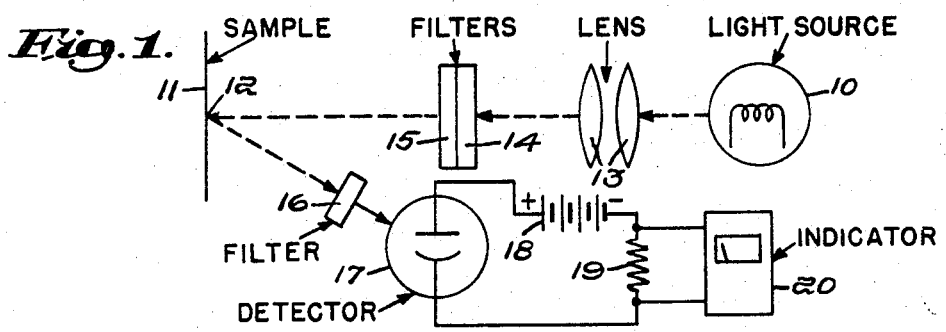
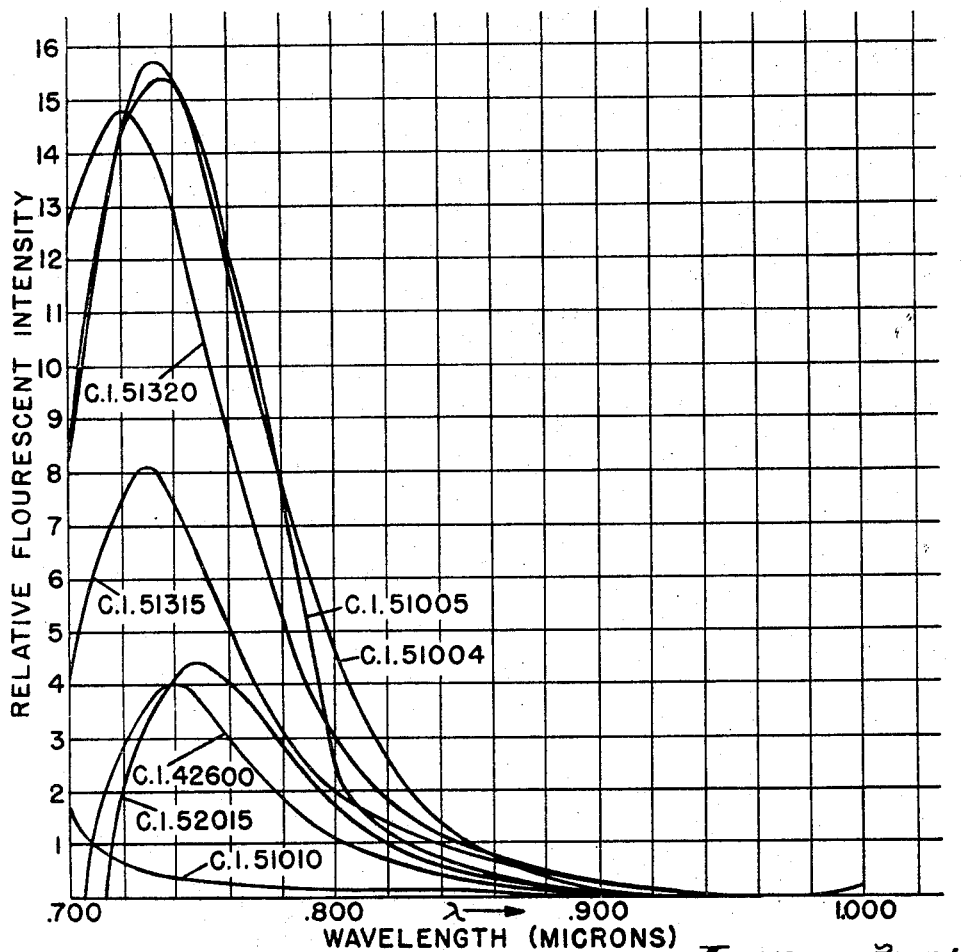

United States Patent Office 3,422,266
Patented Jan. 14, 1969

3,422,266
APPARATUS FOR EVALUATING THE EFFECTIVENESS OF CAMOUFLAGE AGAINST DETECTION BY INFRARED PHOTOGRAPHY
Alvin O. Ramsley, 15 Farm Road,
Sherborn, Mass. 01770
Filed Jan. 19, 1967, Ser. No. 610,734
U.S. Cl. 250—71                   4 Claims
Int. Cl. G01n 21/00; G01n 21/16; G01n 23/00

ABSTRACT OF THE DISCLOSURE

A method of evaluating the effectiveness of the camouflage of a surface against detection by infrared photography and an instrument for determining the fluorescence of a surface in the infrared region of the spectrum comprising a source of energy in the visible range, a filter for removing infrared energy from the visible energy, means for supporting a sample to receive the filtered visible energy, a filter for removing visible energy from the energy emitted by the sample, a photoelectric tube circuit for detecting infrared energy emitted by the sample and converting it into an electronic signal, and means for measuring the magnitude of the electronic signal as an indication of the effectiveness of the camouflage of the surface against detection by infrared photography.

---

This invention relates to an apparatus and a method for inspecting a surface, particularly a dyed surface, to determine the degree of fluorescence of the surface in the infrared range of the spectrum and of the effectiveness of the camouflage of the surface against detection by infrared photography.

Military clothing, tentage and the like are dyed so as to blend with the normal background of foliage and earth and thus provide a reasonable degree of camouflage in visible light. However, in modern warfare, aerial photography has come into large scale use in detecting the presence of troops and supplies. Infrared sensitive photographic films are much more effective for this purpose than films sensitive only to visible light. Most of the dye systems employed with military fabrics in the past have reflectance properties with respect to radiant energy in the infrared region that do not correspond with those of the background against which the fabrics may be photographed. Consequently, when such dyed fabrics in a natural environment are subjected to aerial photography using infrared sensitive film, they appear dark against a light background. The contrast thus reveals the position of the dyed fabrics and therefore of troops or military equipment.

One possible solution to this problem in camouflage against aerial photographic reconnaissance is to find dyes or dye systems which, while providing adequate camouflage in the visible spectrum against visual observation in daylight, will fluoresce in the infrared region of the spectrum, particuarly in the near infrared region, and thus appear relatively bright when photographed from the air while using infrared sensitive film, thereby markedly reducing or eliminating contrast with the background.

It is an object of my invention to provide an apparatus by means of which the degree of fluorescence of a surface in the infrared region of the spectrum can be easily and quickly determined.

Another object of my invention is to provide an apparatus for rapidly screening dyed fabrics to determine their relative ability to fluoresce in the infrared region of the spectrum.

A further object is to provide a method of determining the degree of fluorescence of a surface in the infrared region and thereby of evaluating the effectiveness of the camouflage of said surface against detection by infrared photography.

A still further object is to provide a method of rapidly determining the ability of dyed fabrics to fluoresce in the infrared region.

A feature of my invention is the provision of means for determining fluorescence in the infrared region of the spectrum with a single reading which can be obtained quickly on a sample. Heretofore, it has been necessary to run a relative fluorescent intensity vs. wavelength curve using a spectrophotometer, such as a modified Model DU Beckman spectrophotometer, many individual readings being taken at various wavelength intervals and plotted on graph paper. This is a very tedious operation, requiring sometimes as much as several hours for a single sample.

In accordance with my invention, I employ means for filtering out substantially all radiant energy in the infrared range from a source of radiant energy, but allowing only visible light to pass through the filter and impinge on the sample. The radiant energy coming from the sample surface contains reflected energy in the visible range and may contain some fluorescent energy in the infrared range. The reflected energy in the visible range is filtered out while the infrared energy which is emitted by the sample passes through a second filter and impinges on a detector which is sensitive in the infrared range of interest. The detector converts the infrared energy to an electronic signal which is utilized to indicate the degree of fluorescence of the sample in the infrared range of interest. Thus a single reading, quickly obtained, is sufficient to indicate to what extent a given dyed sample of fabric or other surface fluoresces in the infrared range of the spectrum selected as of interest. The second filter and the detector can be selected to cover any desired range of the infrared. For example, it may be desirable to limit the transmission of the second filter and the sensitivity of the detector to that portion of the infrared range which lies below (in wavelength) the range normally employed with the sniperscope at night. In this case, wavelengths in the infrared range up to about 0.9 micron would be permitted to pass through the second filter and be detected and measured. My apparatus is designed to measure fluorescent radiation in the range from about 0.7 micron to about 1.0 micron in wavelength and it is preferred that it be designed to measure fluorescent radiation in the range from about 0.8 micron to about 0.9 micron in wavelength since this is the range of greatest interest for detecting camouflage by aerial photography and, therefore, represents the type of fluorescence in dyed articles that is needed for camouflage against aerial photographic reconnaissance.

The above-mentioned and other features and objects of the invention will become more apparent by reference to the following description of one embodiment of the invention taken in conjunction with the accompanying drawings, in which:

FIGURE 1 is a schematic diagram of a photoelectric infrared fluorophotometer apparatus in accordance with the present invention.

FIGURE 2 shows a diagram of the relative fluorescent intensity of several dyed samples of fabric at various wavelengths in the infrared range of the electromagnetic spectrum as determined with a modified Beckman Model DU spectrophotometer.

In the embodiment of my invention shown in FIGURE 1, 10 is a source of radiant energy, the wavelengths of which for the most part are within the visible and infrared ranges from about 0.4 micron to about 3.0 microns. This source may be an 18-ampere, 6-volt tungsten lamp. A sample 11, the surface of which is to be inspected to determine the degree of fluorescence thereof in the infrared range, is positioned so that a surface 12 is normal to the path of travel of the radiant energy. The radiant energy from source 10 is collimated by means of lens system 13.

The collimated beam of radiant energy is passed through filters 14 and 15 to remove radiant energy in the infrared range while passing the radiant energy in the visible range or lower wavelengths so that the radiant energy which impinges on the surface 12 of sample 11 has wavelengths less than about 0.7 micron. Thus it is assured that any radiant energy in the infrared range above about 0.7 micron which emerges from surface 12 will be due to fluorescence resulting from radiant energy in the visible range being absorbed and reemitted at longer wavelengths, namely wavelengths above 0.7 micron. Filter 14 is preferably a heat absorbing filter, such as a KG3 filter produced by Optics Technology, Inc., of Palo Alto, Calif. Filter 15 is preferably an interference filter, such as Dielectric Interference Filter No. 648, also produced by Optics Technology, Inc.

The radiant energy leaving surface 12 is partly reflected radiant energy in the visible range below about 0.7 micron in wavelength and partly (in certain cases) reemitted fluorescent radiant energy in the infrared range above about 0.7 micron in wavelength. It is, therefore, passed through filter 16 positioned at about a 45-degree angle to surface 12 to absorb and remove the radiant energy in the visible range below about 0.7 micron and to permit any radiant energy in the infrared range above about 0.7 micron therein to pass and be detected. In the embodiment described, filter 16 is made by combining in series two No. 2600 polished filters, each about 3 mm. thick, produced by The Corning Glass Company. This type of filter limits the wavelength range of response of this embodiment to that used for infrared photography.

The radiant energy which passes through filter 16 may have wavelengths from about 0.7 micron to about 1.0 micron. It is thereafter impinged on detector 17, which is preferably a photoelectric tube sensitive to radiant energy in the wavelength range of the infrared portion of the spectrum in which interest lies. This is in general within the range from about 0.7 micron to about 1.0 micron and preferably within the range from about 0.8 micron to about 0.9 micron. A suitable detector for this purpose is an RCA-917 photoelectric tube produced by the Radio Corporation of America.

As shown in FIGURE 1, the detector 17 is connected in a simple series circuit with a 22.5 volt battery 18 and a five megohm load resistor 19. When radiant energy reaches the photoemissive cathode of the phototube, current flows through the circuit developing a voltage drop across resistor 19 which is directly proportional to the amount of radiant energy reaching the detector 17.

This voltage drop is visually indicated and measured by connecting a vacuum tube voltmeter 20 in parallel with resistor 19. A Hewlett Packard Model 412A vacuum tube voltmeter was used in making the measurements set forth in Table 1 below. The voltmeter reading is directly proportional to the amount of radiant energy reaching the detector 17 such that this reading is a direct indication of the degree of fluorescence of the sample surface 12 in the infrared range of interest.

With the photoelectric infrared fluorophotometer described above and with an undyed, white fabric as the sample, a reading of about 0.015 volt may be obtained on the voltmeter. Readings below about 0.020 volt were considered to indicate little or no fluorescence in the infrared range of interest. The low reading obtained with the undyed fabric apparently represents an overlap in the transmittances of the filters 14, 15 and 16. Readings above about 0.020 volt provide a relative indication of the degree of fluorescence of the dyed surface of the sample, i.e., the higher the reading, the greater the fluorescence of the sample surface. Table 1 gives readings in volts obtained with various dyed fabric samples using the embodiment of the invention described above. The readings have been shown by experiments described hereinafter to be indications of the relative degree of fluorescence in the infrared range of interest for the dyes used.

TABLE 1

| Dye | Color index No. | Fabric type | Fluorophotometer reading (volts) | Maximum in the relative fluorescent intensity curve (Fig. 2) |
| --- | --- | --- | --- | --- |
| Brilliant Cresyl Blue | 51010 | Polyacrylic | 0.016 | |
| Basic Violet 4 | 42600 | ___do___ | 0.065 | 3.9 |
| Basic Blue 9 | 52015 | ___do___ | 0.093 | 4.4 |
| Direct Blue 107 | 51315 | Polyamide | 0.105 | 8.1 |
| Direct Blue 108 | 51320 | ___do___ | 0.180 | 14.8 |
| Basic Blue 3 | 51005 | Polyacrylic | 0.270 | 15.4 |
| Basic Blue 4 | 51004 | ___do___ | 0.275 | 15.7 |

The dyed fabrics tabulated in Table 1 were also measured with a modified Beckman Model DU spectrophotometer to determine their relative fluorescence in the infrared range. Radiant energy from a 150-watt xenon lamp was passed through the same type of filter as the combination of filters 14 and 15 of the photoelectric infrared fluorophotometer of this invention to remove any infrared radiant energy and permit the visible radiant energy to pass through and impinge upon the fabric sample. Radiant energy reflected from or reemitted from the fabric sample was passed into the monochromator of the modified Beckman spectrophotometer. Readings were taken from 0.7 micron to 1.0 micron. These are plotted in FIGURE 2 in which the wavelength of the radiant energy is plotted in the abscissa and the relative fluorescent intensity in the infrared range is plotted in the ordinate. In general, the height of the peak in each curve indicates the relative degree of fluorescence in the infrared range of the particular sample. It will be noted that the peak occurs at different wavelengths for the different samples. Comparison of the curves in FIGURE 2 with the measurements obtained with the photoelectric infrared fluorophotometer given in Table 1 demonstrates that the device of this invention provides a good indication of the degree of fluorescence of a sample in the infrared range of the spectrum.

The extent of correspondence between the values obtained with the photoelectric infrared fluorophotometer and those obtained with the modified Beckman spectrophotometer will depend to a large extent on the sensitivity range of the detector used in the photoelectric infrared fluorophotometer. It will also be dependent on the transmittances of the filters at various wavelengths of the spectrum. By proper selection of these components the photoelectric infrared fluorophotometer can be made to give a relatively accurate indication of the degree of fluorescence of a given sample in a particular portion of the infrared range.

It is thus seen that a single measurement, quickly obtained with the photoelectric infrared fluorophotometer of the present invention, is sufficient to characterize the ability of a dyed fabric or other surface to fluoresce in the infrared range of the spectrum. Numerous readings would be required with a spectrophotometer to provide substantially the same information; and such measurements consume a great deal of time of both a skilled technician and an expensive apparatus. It is apparent, therefore, that the simple device and method of the present invention provide a great advantage over the prior art devices and methods for the determination of relative degrees of fluorescence in the infrared range by personnel of limited training and experience. The invention will be particularly advantageous in screening large numbers of dyes and dyed structures for the purpose of selecting those which may be particularly useful either because they have a relatively high tendency to fluoresce in the infrared or because of a very low tendency, or no tendency, to fluoresce in the infrared.

Although the invention has been described in terms of its use for determining fluorescence in a particular narrow band of the infrared range, it is to be understood that the invention is not limited to such usage. It could, for example, be extended to the determination of the tendency of a surface to fluoresce in other portions of the infrared by careful selection of the filters and the detector. Wherever the determination of relative degree of fluorescence is a problem, my apparatus and method may be advantageous in making the determination thereof quantitative at a greatly increased speed over the use of the well-known spectrophotometer method.

It will be understood that various changes in the details, materials and arrangements of parts, which have been described and illustrated in order to explain the nature of the invention, may be made by those skilled in the art, within the principle and scope of the invention as expressed in the appended claims.

I claim:
1. In an apparatus for evaluating the effectiveness of the camouflage of a surface against detection by infrared photography, wherein the surface comprises a fluorescent material emitting rays, upon excitation, having wavelengths longer than 0.7 micron, the combination which comprises:
   (a) a source of radiant energy in the visible range,
   (b) means for filtering said radiant energy to remove any radiation in the infrared range in which fluorescence of said surface occurs,
   (c) means for supporting said surface to receive said filtered radiant energy in the visible range,
   (d) means for detecting radiant energy in the infrared range emitted from said surface and converting it into an electronic signal, said detected radiant energy in the infrared range is characterized by having wavelengths of from about 0.7 micron to about 1.0 micron,
   (e) means interposed between said surface and said detecting means for absorbing radiant energy in the visible range reflected from said surface, and
   (f) means for indicating the magnitude of said electronic signal whereby the degree of effectiveness of the camouflage of said surface against detection by infrared photography is indicated by the magnitude of said electronic signal.

2. Apparatus according to claim 1 wherein said detected radiant energy in the infrared range is characterized by having wavelengths of from about 0.8 micron to about 0.9 micron.

3. Apparatus according to claim 1 wherein said means for filtering said radiant energy to remove radiation in the infrared range in which fluorescence of said surface occurs comprises a filter for absorbing radiant energy having wavelengths above about 0.7 micron.

4. Apparatus according to claim 1 wherein said means for filtering said radiant energy to remove radiation in the infrared range in which fluorescence of said surface occurs comprises the combination of a heat-absorbing filter and an interference filter for absorbing radiant energy having wavelengths above about 0.7 micron.

References Cited

UNITED STATES PATENTS

| 2,852,693 | 9/1958 | Hughes et al. | 250—71 |
| 3,105,908 | 10/1963 | Burkhardt et al. | 250—71 |

RALPH G. NILSON, *Primary Examiner.*

M. J. FROME, *Assistant Examiner.*

U.S. Cl. X.R.

250—83.3